March 18, 1930. E. R. BOOTS ET AL 1,751,070
REFLECTOR FOR AUTOMOBILES
Filed March 26, 1928
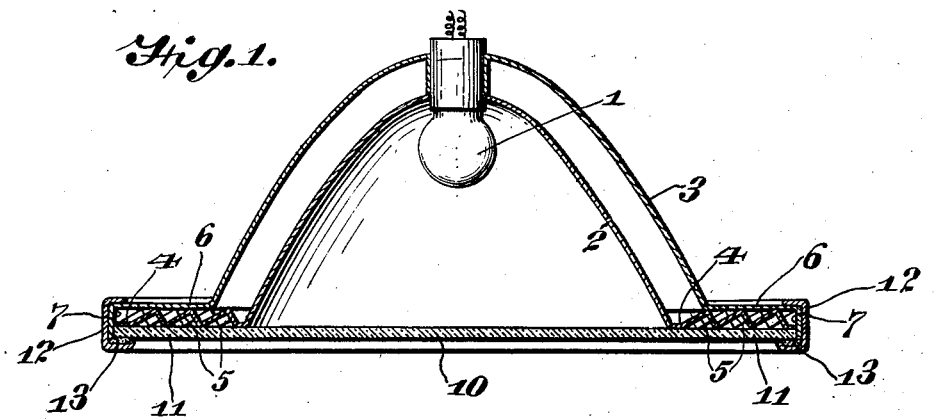
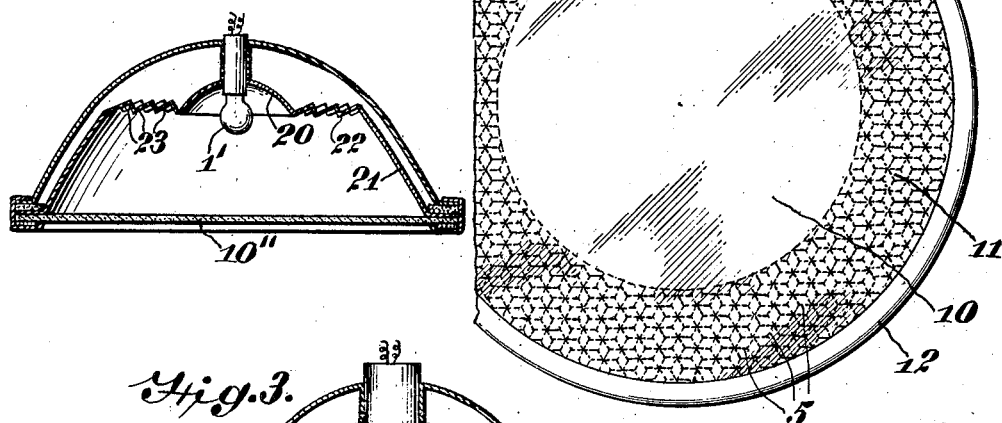
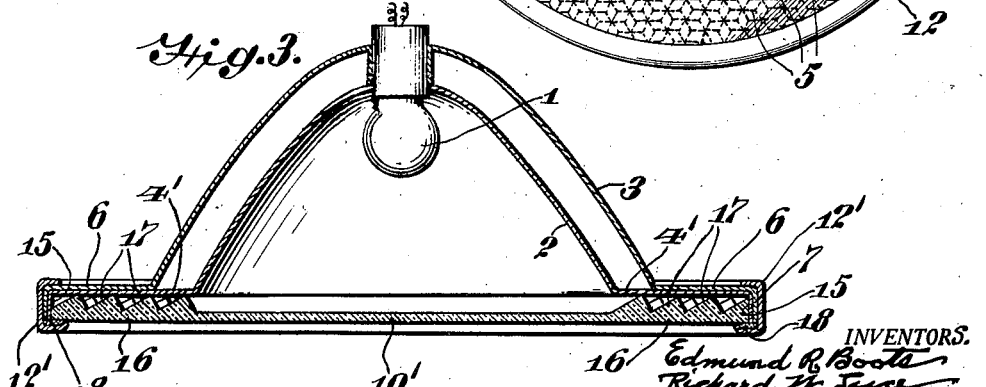
INVENTORS.
Edmund R. Boots
Richard W. Luce
BY Victor L. Oestnall
Cyrus N. Anderson
ATTORNEY.

Patented Mar. 18, 1930

1,751,070

UNITED STATES PATENT OFFICE

EDMUND R. BOOTS, OF SHORT HILLS, RICHARD W. LUCE, OF MAPLEWOOD, AND VICTOR L. OESTNAES, OF WESTFIELD, NEW JERSEY, ASSIGNORS TO AMERICAN GAS-ACCUMULATOR COMPANY, OF ELIZABETH, NEW JERSEY, A CORPORATION OF NEW JERSEY

REFLECTOR FOR AUTOMOBILES

Application filed March 26, 1928. Serial No. 264,732.

In the operation of automobiles and other like vehicles it is practically necessary and is required that they be provided with lights at the front and rear ends thereof. The front lights are known usually as head-lights and are employed for the purpose of illuminating the road-way or street in front of the automobile or other vehicle and also that the presence of such vehicle may be made known to approaching vehicles; while the rear lights are usually known as tail-lights and are employed for the purpose of providing readily visible means for following vehicular traffic.

These lights are associated with reflectors which direct the rays from the lights either forwardly or rearwardly with respect to the automobile or other vehicle. These lights may consist either of electrically heated filaments as sources of light or they may consist of gas flames. The character of the light is immaterial.

It happens not infrequently that the lights upon an automobile or other like vehicle become extinguished. It is desirable that in such event the said automobile be provided with means whereby its presence may be more readily made known to approaching vehicles than otherwise would be the case.

The general object of our invention, therefore, is to provide means in association with the head-lights, tail light, or other light of an automobile or like vehicle whereby in case of the extinguishment thereof the presence of such automobile or other vehicle is likely to be made known to approaching automobiles or other vehicles.

It also is an object of the invention to provide means in association with the head-lights tail-light or other light upon automobiles or other like vehicles which is adapted to be rendered luminous by the head-lights of approaching automobiles, such luminous means being clearly visible to the chauffeur or driver of such approaching automobile.

A further object of the invention is to provide in association with the head-lights, tail-light, or other light of an automobile or like vehicle light reflectors, preferably of the self-focusing type, which are adapted to reflect the rays of light from the head-lights of an automobile or other like vehicle back to the driver or chauffeur of an approaching automobile.

Other objects and advantages of the invention will be pointed out in the detailed description thereof which follows or will be apparent from such description. In order that the invention may be readily understood and its practical advantages more fully appreciated reference should be had to the accompanying drawing in which we have illustrated several forms of construction each containing an embodiment of the invention. However, it is to be understood that the invention is susceptible of embodiment in other forms of construction than those shown and that various mechanical changes in the construction may be made within the scope of the claims without departing from the invention or the principle thereof.

In the drawing:

Fig. 1 is a view in horizontal section of a light, such as a head-light, adapted to be used upon automobiles or other vehicles, the said light having means associated therewith embodying the invention;

Fig. 2 is a view in front elevation of the said light;

Fig. 3 is a view similar to that shown in Fig. 1 illustrating a modified construction of the invention; and Fig. 4 is a horizontal sectional view of a fragmentary portion of an automobile light showing still another modified construction of means embodying the invention.

In Figs. 1 to 3 of the drawing we have shown an electric light 1 which is located at a point substantially coincident with the principle focus of the parabolic reflecting surface of the reflector 2. The reflector 2 is mounted within a casing 3. The light and the reflector structure comprising the parts 2 and 3 are of the usual well known construction.

Referring now to Figs. 1 and 2 of the drawing it will be noted that the reflector 2 is provided at its outer edge with a laterally extending flange-like portion 4 the front surface of which is provided with a multiplicity of contiguously located depressions the surfaces of which are related to each other as the three sides of a corner of a cube. In other words, the three surfaces of each depression are arranged in right angular relation to each other and each of the said depressions or holes constitutes a reflector unit. These reflector units are indicated at 5. The surfaces of the respective units being arranged at right angles to each other as illustrated it follows that rays of light which impinge thereon are reflected back in directions substantially parallel with the incident rays. The portion 4, while illustrated as being integral with the outer edge of the reflector 2 may be separate therefrom. The contiguously related reflectors may be described generally as hollow self-focusing reflector units and it will be understood that self-focusing units of other construction may be employed. The rear side of the portion 4, whether integral with the outer edge of the reflector 2 or separate therefrom is supported against the front side of a flange portion 6 which extends laterally from the edge of the outer casing 3. The flange 6 is provided at its outer edge with a forwardly extending flange portion 7 which extends in a direction substantially at right angles to the plane of the front face of the reflector structure.

A lens 10 of usual construction is mounted upon the front of the reflector through which the rays of light from the light source 1 pass. The said lens extends outwardly and the outer marginal or flange portion 11 thereof overlies the reflectors 5 previously referred to and described. The outer edge of the flange portion 11 terminates, in the construction illustrated in Figs. 1 and 2, in flush relation to the outer edge of the portion 4. The opposite sides of the flange portion 11 are plane as shown, but in order that the best results may be obtained the said flange portion is rendered light diffusing in one way or another as by roughening of one or both sides thereof. For the purpose of fastening and holding the lens in place we have provided a rim 12 which is of channel shape in cross section the open side thereof extending inwardly as shown in Fig. 1. The opposite flanges of the said rim 12 inclose the outer edges of the flange 6 and the flange portion 11. For the purpose of providing a cushioning support for the lens 10 a washer of cushioning material 13 is provided between the front side of the outer edge portion of the flange portion 11 and the adjoining flange of the channel shaped rim member 12. It will be apparent that if the light at 1 should become extinguished the reflectors 5 of the portion 4 would be illuminated by the rays of light from an approaching vehicle so that the driver of such approaching vehicle would be apprised of the presence of the automobile the lights of which had become extinguished.

In the construction as illustrated in Fig. 3 the outer edge of the reflector 2 is provided with a flange 4' which is plane and which is located in contact with the flange 6 of the casing 3. The flange 4' is provided at its outer edge with a forwardly extending flange portion 15 which is parallel and in contact with the forwardly extending flange portion 7.

The lens 10' extends outwardly and the rear surface of its outer marginal or flange portion 16 is provided with a multiplicity of contiguously located projections 17 the surfaces of each of which are arranged in right angular relation to each other as, for example, the three sides of a corner of a cube. The rear ends of the projections 17 are positioned against the forward side of the flange 4'. The front face of the flange portion 16 is plane. Preferably the flange portion 16 should be provided with means whereby the light reflected by the surfaces of the projections 17 will be diffused. Such diffusion may be effected in various ways. For example, diffusion may be effected by roughening the front plane surface of the flange portion 16. The lens is held in position by means of a rim 12' of channel shape in cross section the opposite flanges of which overlie or inclose the outer edges of the flange 6 of the casing 3 and of the flange portion 16 of the lens 10'. Preferably a washer 18 of cushioning material is provided between the lower flange of the rim 12' and the adjoining outer edge portion of the flange portion 16.

The surfaces of the three sides of each of the projections 17 being in right angular relation to each other, it will be understood that the rays of light which emanate from the head-lights of an approaching automobile which impinge upon the front surface of the flange portion 16 pass therethrough and are reflected from the surfaces of the said projections back in directions substantially parallel with the incident rays which may emanate, as stated, from the head-lights of an approaching automobile. In that way the driver of the approaching automobile is apprised of the presence of the automobile which he may be approaching and the lights of which have become extinguished.

Although in Figs. 1 and 2 and 3 we have shown specific forms of reflectors which have the capacity of reflecting rays of light back toward their source in directions substantially parallel with the incident rays it will be understood that reflectors of other construction having like capacity may be employed. The essential characteristic of the invention is that there shall be associated with the usual lights and the usual reflectors of an automobile reflectors for reflecting back to the driver or chauffeur of an approaching automobile light rays from the lights of such approching automobile in order that he may be made cognizant of the presence of the automobile which he may be approaching even though the lights thereof may have become extinguished.

In the construction as illustrated in Fig 4 we have shown the reflector for reflecting the rays of light from a lamp located therein divided into two sections, the principal focus of the sections being substantially coincident. These sections are indicated at 20 and 21. The inner surfaces thereof constitute parabolic reflectors. The light source is indicated at 1' and is located coincidentally with the principal focus of the two reflector surfaces of the reflectors 20 and 21. The diameter of the section 21 is relatively much greater than would be the diameter of the reflector 20 provided its edges had been extended outwardly or forwardly to a plane coincident with the front edge of the section 21. It follows, therefore, that the inner edge of the section 21 is spaced a substantial distance from the outer edge of the reflector 20 thus providing an annular space between the two. This space is closed by means of a reflector 22 which comprises a multiplicity of central triple or self-focusing reflectors 23 arranged or located in contiguous relation to each other as shown. By the arrangement as illustrated in this figure of the drawing it will be seen that the opening at the outer end of the reflector for reflecting the light from the source 1' is of substantially greater width or area than would be the case if the edges of the reflector 20 were extended outwardly in the usual manner.

It will be apparent that if the light 1' of an automobile light should become extinguished the presence of the automobile would be made known to the occupants of approaching automobiles by reason of the fact that the reflectors at 23 would be rendered luminous by the reflected light from the head-lights of such approaching automobiles.

The lens 10" is supported at its outer edge upon the outer edge portion of the reflector 21 and the outer edge portion of said lens operates to effect diffusion of the light reflected from the reflectors 23.

As already indicated, the construction the embodiment of which is illustrated in Fig. 4 provides means whereby the front open end of the reflector of the head-light may be of relatively great area.

Although we have described our invention and illustrated the same in connection with and as a part of automobile head and tail lights, we desire it to be understood that devices or means embodying our invention are susceptible of use in connection with signal lights upon highways, streets, and the like, so that in case such lights become extinguished the signaling may be effected by the illumination of the said devices of our invention which are associated therewith.

Having thus described our invention, what we claim and desire to secure by Letters Patent is:

1. In combination, a source of light, a reflector surrounding the said source of light and adapted to reflect and project the rays of light therefrom outwardly, a multiplicity of self-focusing light reflectors associated with and located outside of the outer edge portion of the first named reflector, and a lens for the said light.

2. In combination, a source of light, a reflector at the principal focus of which the said light source is located, the said reflector reflecting and projecting the rays of light from said source outwardly, and a multiplicity of self-focusing light reflectors located in contiguous relation to each other and surrounding the first named reflector.

3. In an automobile light, the combination of a parabolic reflector, a source of light located at the principal focus of the said reflector, and an annular band consisting of a multiplicity of self-focusing reflectors mounted upon the first named reflector and surrounding the outer edge portion thereof.

4. In combination, a source of light, a reflector within which the said source of light is located and by which the rays of light from said source are reflected and projected outwardly, the said source of light being located at the principal focus of the said reflector, a second reflector of larger diameter than the first named reflector, the inner edge of which terminates in a plane substantially coincident with the outer edge of the first named reflector, the said two reflectors being spaced from each other and the principal focus of the second named reflector being substantially coincident with the principal focus of the first named reflector, and a multiplicity of self-focusing reflectors mounted in the space between the outer edge of the first named reflector and the inner edge of the second named reflector.

5. In combination, a reflector having a parabolic reflecting surface, a source of light located at the principal focus of said reflector, a second reflector consisting of the outer portion of a parabolic reflector the principal focus of which is located at a point substantially identical with that of the first named reflector, the inner edge of the second named reflector being located outside of and in spaced relation to the outer edge of the first named reflector, and a series of contiguously located central triple reflectors mounted within the space between the two first named reflectors.

6. In an automobile light, the combination of a reflector, a source of light located within said reflector the rays from which are adapted to be reflected and projected thereby, and reflecting means associated with and surrounding the outer edge portion of the first named reflector and adapted to reflect rays of light which impinge thereon in directions substantially parallel with the incident rays, the said series of reflectors being thereby illuminated and rendered visible.

7. In combination, two parabolic reflectors having a common axis and the principal foci of which are located substantially at the same point, one of said reflectors constituting the closed end portion of a parabolic reflector and the other of said reflectors constituting the outer end portion of a parabolic reflector, the abscissa of the latter being greater than the abscissa of the former, and a reflector of annular shape consisting of a multiplicity of self-focusing reflectors located in contiguous relation to each other, the said annular reflector being located between the outer edge portion of the first named reflector and the inner edge portion of the second named reflector.

8. In a light for automobiles, the combination of a light source, a reflector for reflecting the rays of light from said source outwardly from the automobile, a multiplicity of self-focusing reflectors associated with and located outside of and in contiguous relation to the outer edge of the first named reflector which self-focusing reflectors reflect rays of light from an outside source which impinge thereon in directions substantially parallel to the incident rays, and a cover-plate of transparent material supported in front of said reflectors.

9. In a light for automobiles, the combination of a light source, a reflector for reflecting rays of light from said source outwardly from the said automobile, a series of self-focusing reflectors located in contiguous relation to and surrounding the outer edge of said first named reflector, and a lens for said first named reflector, a portion of said lens overlying the said series of self-focusing reflectors.

10. In a light for automobiles, the combination of a light source, a reflector for reflecting rays of light from said source outwardly from the said automobile, a reflector surrounding said first named reflector and comprising a plurality of central triple reflectors, and a lens for said first named reflector, said lens extending outwardly and overlying said second named reflector.

11. In combination, two parabolic reflectors having a common axis and the principal foci of which are located at substantially the same point, one of said reflectors constituting the closed end portion of a parabolic reflector and the other of said reflectors constituting the outer end portion of a parabolic reflector, and a reflector of annular shape, the said annular reflector being located between the outer edge portion of the first named reflector and the inner edge portion of the second named reflector.

12. In combination, two parabolic reflectors having a common axis and the principal foci of which are located at substantially the same point, one of said reflectors constituting the closed end portion of a parabolic reflector and the other of said reflectors constituting the outer end portion of a parabolic reflector, a reflector of annular shape, the said annular reflector being located between the outer edge portion of the first named reflector and the inner edge portion of the second named reflector, and a lens for said parabolic reflectors, a portion of said lens being adapted to overlie the said annular reflector.

13. In combination, two parabolic reflectors having a common axis and the principal foci of which are located at substantially the same point, one of said reflectors constituting the closed end portion of a parabolic reflector and the other of said reflectors constituting the outer end portion of a parabolic reflector, the abscissa of the latter being greater than the abscissa of the former, a reflector of annular shape consisting of a plurality of self-focusing reflectors located in contiguous relation to each other, the said annular reflector being located between the outer edge portion of the first named reflector and the inner edge portion of the second named reflector, and a lens for said parabolic reflectors, a portion of said lens being adapted to overlie the said annular reflector.

14. In combination, a source of light, a reflector within which the said source of light is located and by which the rays of light from said source are reflected and projected outwardly, the surface of the said reflector flaring outwardly, a second reflector of annular shape and of larger diameter than the first named reflector, the reflecting surface of which flares outwardly and the inner edge of which is located in a plane substantially coincident with the plane of the outer edge of the first named reflector and a series of self-focusing reflectors located in the space between the outer edge of the first named reflector and the inner edge of the second named reflector.

In testimony that we claim the foregoing as our invention, we have hereunto signed our names this 8th day of March, 1928.

EDMUND R. BOOTS.
RICHARD W. LUCE.
VICTOR L. OESTNAES.